(12) United States Patent
Dutier et al.

(10) Patent No.: US 8,113,327 B2
(45) Date of Patent: Feb. 14, 2012

(54) MULTIPLE CLUTCH ASSEMBLY AND AN ASSOCIATED CONTROL METHOD

(75) Inventors: Ivan Dutier, Amiens (FR); Francois Thibaut, Longueau (FR)

(73) Assignee: Valeo Embrayages, Amiens Cedex (FR)

( * ) Notice: Subject to any disclaimer, the term of this patent is extended or adjusted under 35 U.S.C. 154(b) by 708 days.

(21) Appl. No.: 11/992,949

(22) PCT Filed: Nov. 8, 2006

(86) PCT No.: PCT/FR2006/051153
§ 371 (c)(1),
(2), (4) Date: Jan. 8, 2009

(87) PCT Pub. No.: WO2007/057596
PCT Pub. Date: May 24, 2007

(65) Prior Publication Data
US 2009/0127058 A1 May 21, 2009

(30) Foreign Application Priority Data

Nov. 16, 2005 (FR) ...................................... 05 53482

(51) Int. Cl.
*F16D 21/02* (2006.01)
(52) U.S. Cl. .............. 192/48.9; 192/70.252; 192/111.12
(58) Field of Classification Search ............... 192/85.51, 192/48.603, 89.22
See application file for complete search history.

(56) References Cited

U.S. PATENT DOCUMENTS

| 4,702,361 | A | 10/1987 | Banks | |
|---|---|---|---|---|
| 2003/0164274 | A1* | 9/2003 | Feldhaus et al. | 192/48.8 |
| 2004/0079606 | A1* | 4/2004 | Orlamunder et al. | 192/48.8 |
| 2004/0238307 | A1* | 12/2004 | Vogt et al. | 192/48.8 |
| 2007/0193843 | A1* | 8/2007 | Uhler et al. | 192/48.8 |

FOREIGN PATENT DOCUMENTS

| DE | 103 47 114 A1 | 4/2004 |
|---|---|---|
| DE | 103 30 165 A1 | 1/2005 |
| FR | 2 604 228 | 3/1988 |

* cited by examiner

*Primary Examiner* — David D Le
*Assistant Examiner* — David J Hlavka
(74) *Attorney, Agent, or Firm* — Bernato & White, LLC

(57) ABSTRACT

The invention relates to a multiple clutch assembly comprising: first (5, 9) and second (7, 11) friction elements; first (15) and second (17) plates for applying pressure to said respective friction elements; first (21) and second (25) diaphragms for actuating said respective plates, each diaphragm being mobile between a disengaged position (21a, 25a or 25b) and an engaged position (21b or 21c, 25c), said first diaphragm (21) approaching the second diaphragm (25) when it passes from the disengaged position thereof to the engaged position thereof; and first (23) and second (27) means for actuating said respective diaphragms. Said second actuating means (27) comprise means for renewing the course of the second diaphragm (25), in such a way that the second diaphragm (25) follows a pre-determined course between the disengaged position (25a or 25b) and the engaged position (25c) thereof, independently of the degree of wear of the second friction element (7, 11).

7 Claims, 1 Drawing Sheet

MULTIPLE CLUTCH ASSEMBLY AND AN ASSOCIATED CONTROL METHOD

CROSS-REFERENCE TO RELATED APPLICATIONS AND CLAIM TO PRIORITY

This application relates to International Application No. PCT/FR2006/051153 filed Nov. 8, 2006 and French Patent Application No. 0553482 filed Nov. 16, 2005, of which the disclosures are incorporated herein by reference and to which priority is claimed.

BACKGROUND OF THE INVENTION

1. Field of the Invention

The present invention relates to a multiple clutch assembly in particular for a motor vehicle, and to an associated control method.

2. Description of Related Art

As is known per se, a multiple clutch assembly comprises several clutches, and usually two clutches.

Such a clutch assembly has in particular the advantage of allowing gear changes without break in torque.

Such a clutch assembly does however have the drawback of having an axial size greater than that of a single clutch.

However, this axial size is a critical matter in being able to install the clutch assembly between the engine and the gearbox of certain vehicles.

Thus the aim of the present invention is to provide a multiple clutch assembly having a smaller axial size compared with the multiple clutch assemblies currently available on the market.

BRIEF SUMMARY OF THE INVENTION

This aim of the invention is achieved with a multiple clutch assembly comprising:
  at least first and second friction devices,
  at least first and second plates pressing on these respective friction devices,
  at least first and second diaphragms for actuating these respective plates, each of these diaphragms being able to move between a disengaged position and an engaged position, the said first diaphragm approaching the said second diaphragm when it passes from its disengaged position to its engaged position, and
  at least first and second means of actuating these respective diaphragms,
in which at least the said second actuation means comprise means of taking up the travel of the said second diaphragm, so that this second diaphragm covers a predetermined travel between its disengaged and engaged positions, independently of the degree of wear on the said second friction device.

By virtue of the presence of the travel take up means for the means of actuating the second diaphragm, it is possible to obtain a travel of this diaphragm that is independent of the degree of wear on the associated friction device.

As will be explained hereinafter, this makes it possible in particular to move the two diaphragms axially closer together without there being a risk of interference between them throughout the life cycle of the clutch.

According to other optional characteristics of the clutch assembly according to the invention:
  the said travel take up means comprise a mechanical clearance take up system integrated in the said second actuation means,
  the said travel take up means comprise means for memorising the predetermined travel of the said second diaphragm between its disengaged and engaged positions prior to the setting in rotation of the said pressure plates, the second friction device being in a new state, and for readjusting the disengaged position of the said second actuation means so that the said diaphragm covers the same predetermined travel memorised after the setting in rotation of the said pressure plates,
  the lever arm of the said second diaphragm is greater than that of the said first diaphragm,
  the said first actuation means comprise means of taking up the travel of the said first diaphragm,
  the said clutch assembly comprises two normally open clutches.

The present invention also relates to a method of controlling a clutch assembly in accordance with the above in which, prior to the setting in rotation of the said pressure plates, the said second actuation means are controlled so as to place the said second diaphragm in the engaged position, and the disengaged position of the said second actuation means is adjusted so that the said diaphragm covers the said travel memorised after the setting in rotation of the said pressure plates.

According to other optional characteristics of the control method according to the invention:
  the second friction device being in a new state, there is determined and recorded in the said memorisation means the travel then covered by the said second diaphragm between its disengaged and engaged positions, prior to the setting in rotation of the said pressure plates.

BRIEF DESCRIPTION OF THE SEVERAL VIEWS OF THE DRAWINGS

Other characteristics and advantages of the present invention will emerge from a reading of the following description and an examination of the accompanying figures, in which.

DETAILED DESCRIPTION OF THE INVENTION

Referring to this figure, it can be seen that a normally open double clutch has been chosen as an example.

It must however be noted that the present invention is in no way limited to such a clutch and that it is applicable to double clutches and to multiple clutches in general, and to both normally open and normally closed clutches.

Figure 1:
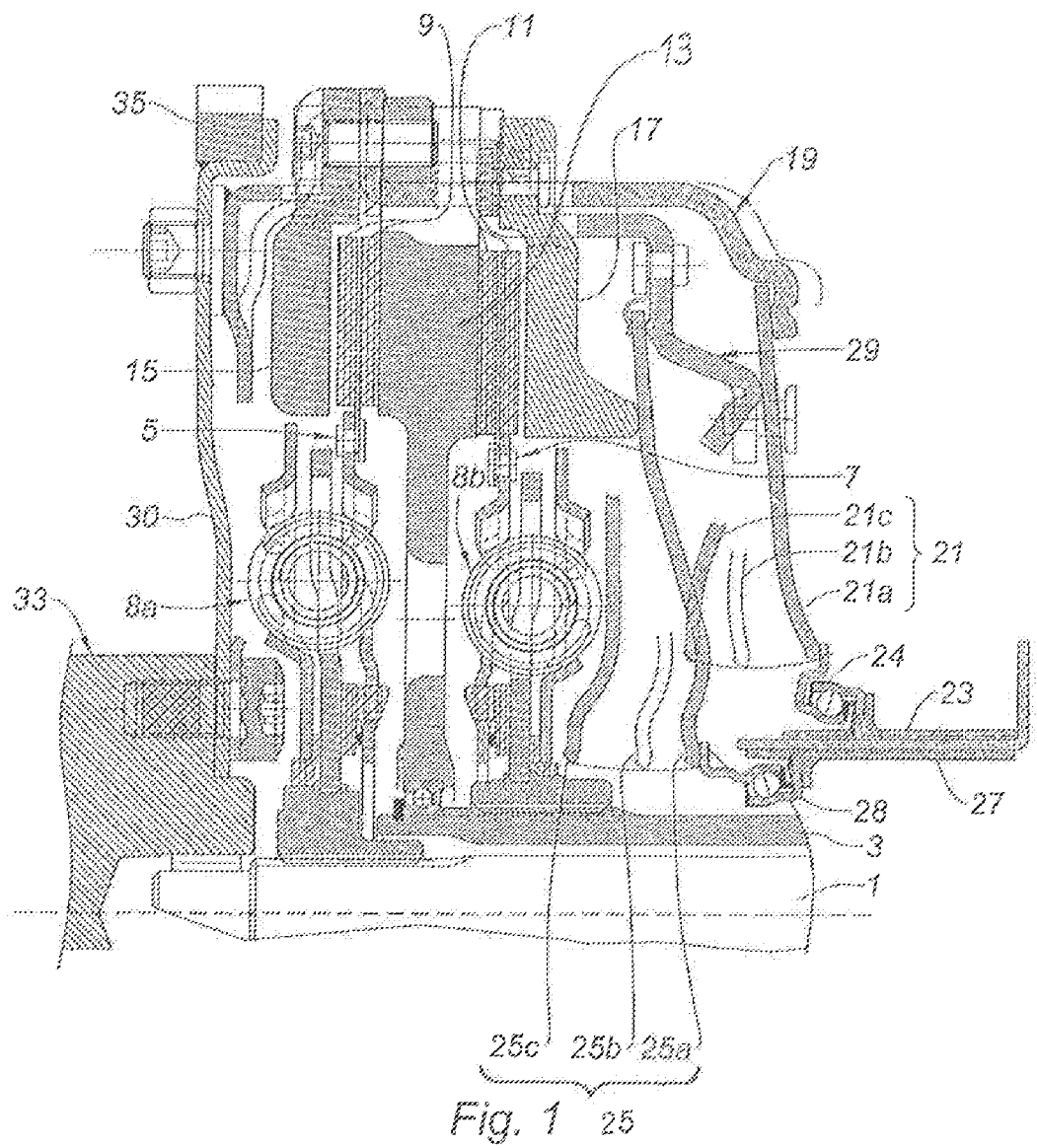
FIG. 1 depicts a view in axial half-section of a clutch assembly according to the invention.

Referring to FIG. 1, it can be seen that the double clutch comprises an internal output shelf 1 mounted coaxial inside an external output shaft 3.

Two friction discs 5, 7 are mounted so as to be secured respectively to the two shafts 1, 3, and each comprises at their periphery respective friction linings 9, 11.

The discs 5, 7 each comprise caution damping means 8a, 8b known per se, for damping the vibrations transmitted by the crankshaft to the clutch.

The linings 9 are disposed between the support plate 13 fixed in axial translation and a pressure plate 15 able to move in axial translation.

The linings 9 are associated with the start-up clutch, that is to say the clutch that makes it possible to pass from neutral to the first gear ratio.

The linings 11 for their part are disposed between the support plate 13 and another pressure plate 17 able to move in axial translation.

The pressure plate 15 is in fact secured to a structure 19 frequently referred to as a "slide", itself able to move in axial translation under the action of a diaphragm 21.

As is known per se, the diaphragm 21 functions like a lever under the action of actuation means 23 able to move in axial translation, a clutch release bearing 24 being interposed between the diaphragm 21 and the actuation means 23.

Concerning the pressure plate 17, this is able to move in axial translation under the direct action of another diaphragm 25 itself actuated by other actuation means 27 able to move in axial translation, a clutch release bearing 28 being interposed between the diaphragm 21 and the actuation means 27.

The lever arm of the diaphragm 25 is preferably slightly greater than the lever arm of the diaphragm 21.

In the example shown, the two clutches are said to be "normally open", that is to say, in the absence of forces exerted by the actuation means 23, 27 on the diaphragms 21, 25, the two clutches are in the disengaged position.

The positions 21a and 25a of the diaphragms 21 and 25 correspond to the disengaged positions of these diaphragms for new linings 9, 11.

The positions 21b and 25b of the diaphragms 21 and 25 correspond respectively to the engaged and disengaged positions of these diaphragms for respectively new and worn linings 9, 11.

The positions 21c and 25c of the diaphragms 21 and 25 correspond to the engaged positions of these diaphragms for worn linings 9, 11.

The disengaged position 25b of the diaphragm 25 for worn linings 11 is different from the disengaged position of this diaphragm for new linings 11 because of the fact that means are provided for taking up the length of travel of the actuation means 27.

These means of taking up the length of travel make it possible to make the parts ("fingers") of the diaphragm 25 that cooperate with the actuation means 27 always cover the same travel whatever the degree of wear on the linings 11.

In practice, this means that, as the linings 11 wear, the fingers of the diaphragms 25 go further and further in their engaged position, and return less and less in their disengaged positions.

The difference between the positions 25a and 25b illustrates this shift in travel along with the wear on the linings 11.

The means of taking up the length of travel of the actuation means 27 can, according to a first variant, be obtained with a mechanical clearance take up system integrated in the actuation means. Such a system is known per se.

According to a second variant, the travel length take up can be obtained by placing the diaphragm 25 in the engaged position before the starting of the engine, for example at the time of turning the ignition key, marking this engaged position, and deducing from this engaged position the disengaged position of this diaphragm, by applying a predetermined length of travel for this diaphragm.

This predetermined length of travel is substantially equal to the travel of this diaphragm between its disengaged and engaged positions when the linings 11 are new.

In other words, each time the vehicle is powered up, the actuation means 27 "learn" the engaged position of the diaphragm 25, and deduce its disengaged position from this.

It will be noted that the two diaphragms 21 and 25 both bear on a structure 29 frequently called a "clutch cover", fixed in axial translation and secured to the fixed support plate 13.

The clutch assembly according to the invention can also comprise a flexible plate 30 secured on the one hand to the crankshaft 33 and on the other hand to the assembly comprising the support plate 13 and the structure 19.

The flexible plate 30 comprises at its periphery a toothed starter ring 35.

The operating method and the advantages of the clutch assembly that has just been described result directly from the above description.

There is no need here to enlarge in detail on the operating mode of a double clutch, this being known per se.

It will simply be stated that, in such a double clutch, the two output shafts 1 and 3 are connected respectively to gearbox input shafts (not shown) supporting gear pinions, respectively odd and even.

The actuation means 23, 27 are controlled automatically so that, when changing gear, at least one of the two output shafts 1, 3 remains under torque, which makes it possible to make gear changes without any sensation of break in torque.

Figure 2:
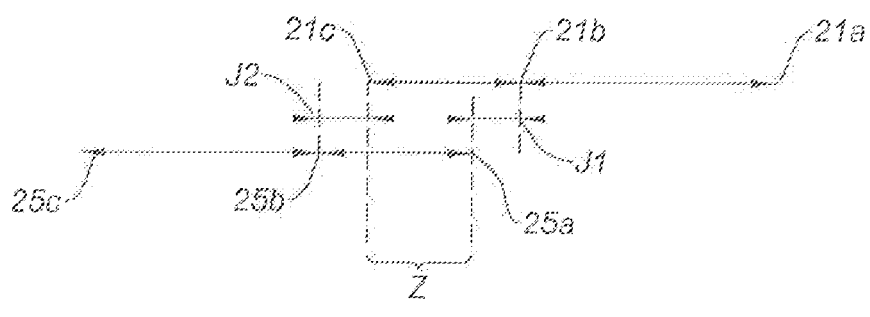
FIG. 2 depicts schematically the travels covered by the diaphragms of the clutch assembly according to the invention.

As can be seen in FIGS. 1 and 2, when the linings 9 and 11 are new, there exists a certain axial clearance J1 between the fingers of the diaphragm 21 in the engaged position and the fingers of the diaphragm 25 in the disengaged position (positions 21b and 25a respectively). In other words, there is no interference between the fingers of each diaphragm.

On the other hand, it can be seen that, as the linings 9, 11 wear, if the disengaged position 25a of the diaphragm 25 does not vary there will end up being interference (indicated by the letter Z in FIG. 2) between this disengaged position and the engaged position 21c of the diaphragm 21.

Such interference can of course not be contemplated, since its means that, beyond a certain wear on the linings 9, it would no longer be possible to engage the associated clutch, the diaphragm 21 coming to abut on the diaphragm 25.

However, precisely, providing travel take-up means in the actuation means 27 makes it possible to prevent the second diaphragm 25 returning as far as a disengaged position in which it could interfere with the diaphragm 21.

As can be seen in particular in FIG. 2, when both the linings 9 and linings 11 are worn there exists an axial clearance J2 (typically around 2 mm) between the engaged 21c and disengaged 25b positions of the respective diaphragms 21 and 25: no interference between these two diaphragms is therefore possible.

Naturally it must be ensured that this absence of interference is guaranteed throughout the wear cycle of the linings 9, 11 and not only when they are completely worn.

This problem is all the more acute when the diaphragms 9 are associated with the start-up clutch, so that they undergo a greater wear than the linings 11.

Providing a greater lever arm for the diaphragm 25 than for the diaphragm 11 makes it possible to compensate for this differential in rate of wear and to ensure that the travels of the fingers of the two diaphragms 21, 25 remain distinct throughout the life cycle of the linings 9, 11.

As can be understood in the light of the above, providing length of travel take-up means for the actuation means 27, and optionally providing a greater lever arm for the diaphragm 25 than for the diaphragm 21, makes it possible to bring these two diaphragms axially closer together without there being a risk of interference between them throughout the life cycle of the clutch.

In this way it is possible to obtain a clutch having a reduced axial size.

Naturally the present invention is in no way limited to the example described and depicted, provided solely by way of illustration.

Thus it would also be possible to provide means of taking up the length of travel of the actuation means 23.

This it would be possible to extend the precepts of the invention to any type of clutch comprising a plurality of diaphragms liable to interfere with each other when the axial distance separating them is reduced.

The invention claimed is:

1. A multiple clutch assembly, comprising:
    at least first (5, 9) and second (7, 11) friction devices;
    at least first (15) and second (17) plates provided for pressing on the respective first and second friction devices;
    at least first (21) and second (25) diaphragms for actuating the respective first and second plates, each of the diaphragms being able to move between a disengaged (21*a*, 25*a* or 25*b*) position and an engaged position (21*b* or 21*c*, 25*c*); the first diaphragm (21) approaching the second diaphragm (25) when it passing from the disengaged position to the engaged position thereof; and
    at least first (23) and second (27) actuating means for actuating the respective diaphragms, the second actuation means (27) comprising travel take-up means for taking-up the travel of the second diaphragm (25) so that the second diaphragm (25) covers a predetermined travel between the disengaged (25*a*, or 25*b*) and engaged (25*c*) positions independently of the degree of wear on the second friction device (7, 11);
    the travel take-up means comprising memorization means for memorizing the predetermined travel of the second diaphragm (25) between the disengaged (25*a* or 25*b*) and engaged (25*c*) positions thereof prior to setting the pressure plates (15, 17) in rotation when the second friction device being in a new state, and for adjusting the disengaged position of the second actuation means (27) so that the diaphragm (25) covers the memorized predetermined travel after setting the pressure plates (15, 17) in rotation.

2. The clutch assembly according to claim 1, wherein the travel take-up means comprise a mechanical clearance take-up system integrated in the second actuation means (27).

3. The clutch assembly according to claim 1, wherein a lever arm of the second diaphragm (25) is greater than that of the first diaphragm (21).

4. The clutch assembly according to claim 1, wherein the first actuation means (23) comprise means of taking up the travel of the first diaphragm (21).

5. The clutch assembly according to claim 1, comprising two normally open clutches.

6. A method for controlling a set of clutches according to claim 1, the method comprising the steps of:
    controlling the second actuation means (27) so as to place the second diaphragm (25) in the engaged position prior to setting the pressure plates (15, 17) in rotation; and
    adjusting the disengaged position of the second actuation means (27) so that the diaphragm (25) covers the memorized predetermined travel after setting the pressure plates (15, 17) in rotation (15, 17).

7. The method according to claim 6, wherein, when the second friction device is in a new state, the travel covered by the second diaphragm (25) between the disengaged (25*a*) and engaged positions thereof is determined and registered in the memorization means prior to the setting in rotation of the pressure plates (15, 17).

* * * * *